Figure 1:
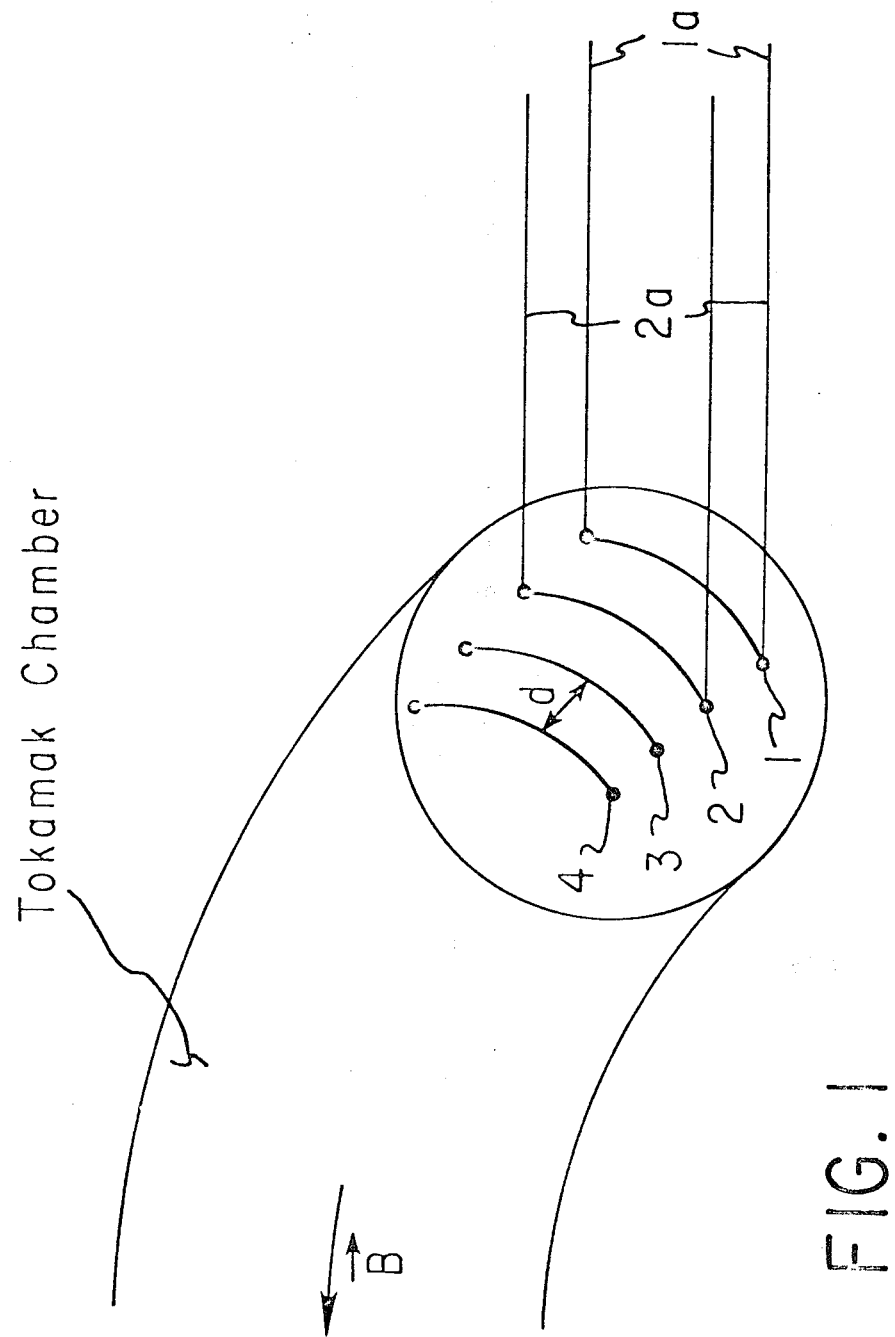

United States Patent [19]

Fisch

[11] 4,423,001

[45] Dec. 27, 1983

[54] SYSTEM AND METHOD FOR GENERATING CURRENT BY SELECTIVE MINORITY SPECIES HEATING

[75] Inventor: Nathaniel J. Fisch, Princeton, N.J.

[73] Assignee: The United States of America as represented by the United States Department of Energy, Washington, D.C.

[21] Appl. No.: 233,297

[22] Filed: Feb. 9, 1981

[51] Int. Cl.³ .............................................. G21B 1/00
[52] U.S. Cl. .................................... 376/123; 376/132
[58] Field of Search ...................... 376/123, 124, 132

[56] References Cited

U.S. PATENT DOCUMENTS

| 3,212,034 | 10/1965 | Kaufman | 376/123 |
| 3,257,283 | 6/1966 | Hamberger | 376/123 |
| 4,057,462 | 11/1977 | Jassby et al. | 376/124 |
| 4,263,097 | 4/1981 | Ohkawa | 376/123 |

OTHER PUBLICATIONS

Phys. Rev. Lett., vol. 41, No. 13, (9/25/78) Fisch pp. 873-876.
Nuclear Fusion, vol. 21, No. 1 (1981) pp. 15-22.
EUR 7424 EN, Heating in Toroidal Plasmas (9/82), vol. II, pp. 1157-1162.
Phys. Rev. Lett., vol. 45, No. 9 (9/1/80) Fisch et al., pp. 720-722.
Phys. Rev. Lett., vol. 43, No. 24 (12/10/79) pp. 1802-1805.
Nuclear Fusion 10(1970) pp. 185-188 Ohkawa.
Nuclear Fusion, vol. 19, No. 9 (1979) pp. 1171-1192, Soharer et al.
Nuclear Fusion, vol. 16, No. 1 (1976) pp. 47-54 Brambilla.
Nuclear Fusion, vol. 19, No. 9 (1979) pp. 1343-1357 Brambilla.
Conf 750905-P2 (pp. 222-230) (9/75) Brambilla.
Phys. Rev. Lett., vol. 37, No. 14, (10/76) pp. 897-898 Jacobson et al.
Phys. Fluids, vol. 16, No. 12 (12/73) pp. 2270-2278 Arnush et al.
Sov. Phys-Tech. Phys. vol. 17, No. 9 (3/73) pp. 1599-1601 Tuiasenko et al.
Sov. Phy. Lett., vol. 1, No. 1 (1/75) pp. 14-15, Berezin et al.

*Primary Examiner*—Sal Cangialosi

[57] ABSTRACT

A system for the generation of toroidal current in a plasma which is prepared in a toroidal magnetic field. The system utilizes the injection of low-frequency waves into the plasma by means of phased antenna arrays or phased waveguide arrays. The plasma is prepared with a minority ion species of different charge state and different gyrofrequency from the majority ion species. The wave frequency and wave phasing are chosen such that the wave energy is absorbed preferentially by minority species ions traveling in one toroidal direction. The absorption of energy in this manner produces a toroidal electric current even when the injected waves themselves do not have substantial toroidal momentum. This current can be continuously maintained at modest cost in power and may be used to confine the plasma. The system can operate efficiently on fusion grade tokamak plasmas.

12 Claims, 1 Drawing Figure

SYSTEM AND METHOD FOR GENERATING CURRENT BY SELECTIVE MINORITY SPECIES HEATING

The Government has rights in this invention persuant to Contract DE-AC02-76-CH03073 awarded by the Department of Energy.

The present invention relates to systems for achieving nuclear fusion.

A number of writings are listed in this paragraph to serve as background for the explanation hereinafter, the writings listed here being merely representative: "Confining a Tokamak Plasma with rf-Driven Currents" (Fisch), *Physical Review Letters*, Vol. 41, Sept. 25, 1978, p. 873 (called Fisch (1978) herein); "System and Method for Generating Steady State Confining Current for a Toroidal Plasma Fusion Reactor" (Fisch), U.S. patent application, Ser. No. 935,222, filed Aug. 21, 1978 (called Fisch (1978b) herein); "Current Generation by Minority Species Heating" (Fisch), Princeton University Plasma Physics Laboratory Report PPPL-1684, May, 1980 (called "Fisch (1980)" herein); "Methods of Driving Current by Heating a Toroidal Plasma" (Fisch), *Proceedings of the Second Joint Varenna-Grenoble International Symposium on Heating in Toroidal Plasma*, Como, Italy, Sept. 3, 1980 (called Fisch (1980b) herein); "Creating an Asymmetric Plasma Resistivity with Waves" (Fisch et al.), *Physical Review Letters*, Vol. 45, Sept. 1, 1980, p. 720 (called Fisch et al. (1980) herein); "Fast-wave Heating of Two-ion Plasmas in PLT through Minority Cyclotron Resonance Damping" (Hosea et al.), *Physical Review Letters*, Vol. 43 (1979) p. 1802 (called "Hosea et al. (1979)" herein); "New Methods of Driving Current in Fusion Devices" (Ohkawa), *Nuclear Fusion*, Vol. 10, (1970), p. 185 (called "Ohkawa (1970)" herein); "Steady-State Operation of Tokamaks by r-f Heating" (Ohkawa), *General Atomic Report* GA-A13847, Feb. 23, 1976 (called "Ohkawa (1976)" herein); "The Peristaltic Tokamak" (Wort), *Plasma Physics*, Vol. 13, 1971, p. 258 (called "Wort (1971)" herein). See, also, Coppi et al. U.S. Pat. No. 3,778,343.

The operation of a tokamak is dependent upon the maintenance of a toroidal electric current to confine the plasma. For a fusion reactor based upon the tokamak concept to become an economic reality, this toroidal current must be produced both cheaply and in long pulses. Long pulses are required in order to limit the metal fatigue arising from the heat stress to which the structural components of the tokamak are subjected in a pulsed device. The method originally envisioned for driving this toroidal current is by means of a time-varying magnetic field which induces a toroidal electric field. This method suffers, however, in that it is inherently a pulsed method. In contrast, the invention described herein provides means of generating this current continuously. Moreover, to sustain this current in the manner prescribed by the present invention requires an amount of power that is small enough for the system to be extremely attractive in fusion applications. Accordingly, it is an object of the present invention to provide a system of steady-state toroidal electric currents in the plasma of a fusion device serving to confine the plasma.

The present invention exploits in a novel manner the principle that the rate of coulomb collisions between charged particles is a sensitive function of the relative speed of the colliding particles. Means are provided to introduce into the plasma minority species ions. Furthermore, means are provided to selectively heat minority species ions traveling in one toroidal direction in order to assure that these (heated) ions collide less with the majority ions than do the unheated minority ions traveling in the opposite direction. Consequently, the majority species ions drag preferentially on the more collisional minority ions, with the result that a relative ion drift is generated with the minority ions, on average, flowing in the direction of the heated ions and with the majority ions, on average, flowing in the opposite direction. In the event that the minority and majority ion species have disparate ion charge states, the oppositely drifting ion populations collide with the plasma electrons with unequal frequency, resulting in a drift of electrons in the direction of the drift of the ions species with the higher charge state. A more detailed description of this mechanism is available in Fisch (1980).

This mechanism for generating current is especially attractive because it does not rely upon an external source of momentum in the direction that the current flows. For example, consider a plasma immersed in a steady magnetic field. To generate a current in the direction of the magnetic field (herein denoted as the parallel direction), it suffices merely to increase the cyclotron motion of selected minority ions in this plasma. This cyclotron heating can be accomplished by launching various radio frequency (rf) waves into the plasma. That the waves need not have substantial parallel momentum allows the advantageous use even of waves with parallel phase velocity much greater than the speed of the minority ions. Such waves may be injected into the plasma by means of properly phased antenna or waveguide arrays. It should be remarked that this heating mechanism has been recently established by Hosea et al. (1979) in the successful use of the fast wave (also called the magnetosonic wave or the compressional ion cyclotron wave) in heating minority species ions in a large tokamak. The present invention utilizes the same wave launching expertise demonstrated by the Hosea et al. (1980) experiment, except that in the present invention only waves traveling in one toroidal direction are launched, whereas in the Hosea et al. experiment waves traveling in both toroidal directions were launched. To launch waves traveling in only one toroidal direction requires an asymmetrical phasing of the waveguide or antenna array. This expertise is also well-known to those skilled in the art as described, for example, by Fisch (1978b). The example of Fisch (1978b) utilizes, however, a waveguide array instead of a coil array and is in a much higher frequency range than that envisioned for the present invention; nevertheless the phasing technique in Fisch (1978b) is an example of the required expertise in the present invention to launch traveling waves in one toroidal direction.

The invention is hereinafter described with reference to the accompanying drawing, denoted as FIG. 1 which shows the orientation of an antenna array with respect to the toroidal plasma chamber.

Only a section of the plasma chamber is shown and many such or similar antenna arrays may be employed. The antenna array shown in FIG. 1 comprises four elements, labeled the antenna 1, the antenna 2, the antenna 3 and the antenna 4. The array is situated on the plasma chamber perimeter. The antenna 1 is fed by the wires 1A, the antenna 2 is fed by the wires 2A and the other antennas may be similarly fed. The antenna spacing d may be taken to be $\lambda_{\|}/4$, where $\lambda_{\|}$ is the wave parallel wavelength. The spacing d between the antennas is in the toroidal direction and the antennas are successively phased by 90° so as to launch a unidirectional wave in the toroidal direction. The steady applied magnetic field $\vec{B}$ points in the toroidal direction, also referred to as the parallel direction.

The phased antenna array depicted in FIG. 1 is only one representative means of launching the required waves that is available to those skilled in the art of launching waves. Other means may consist, for example, of antenna arrays that are center-fed or that have greater or fewer number of elements, or of waveguide arrays that are similarly phased. All such available means are considered to be within the scope of the present invention provided that the phasing of the available means is such as to launch a unidirectional traveling wave that interacts primarily with a minority ion species in the manner described herein.

The invention is described in greater detail hereinafter with reference to a preferred embodiment.

The primary application for the present invention is for the generation of toroidal current in a tokamak which confines a large, hot, dense plasma and which, preferably, is in the class of devices known as fusion devices. By fusion device it is meant a device which produces energy by means of fusion. The uses of such a device range from net production of energy to merely copious emission of high-energy particles. High-energy particles may be of use in subsequent nuclear reactions as in the so-called fusion-fission hybrid reactor. In the preferred embodiment, the toroidal current, generated by the means described herein, is large enough, either alone or in conjunction with toroidal current generated by some other means, to sustain a poloidal magnetic field that is sufficient to confine the plasma. For use in fusion devices, it is desirable that the power required to produce this current be minimized. Accordingly, it is an object of the preferred embodiment not only to provide for the generation of sufficient current for confinement, but to do so at the minimal cost in power.

In the use of the present invention in a fusion device, the preferred majority species comprise a mixture of deuterium and tritium ions. The most advantageous minority species is probably He$^3$, which satisfies the required distinction in charge and charge/mass ratio with respect to both of the majority species. Furthermore, this minority species is itself a fusion reagent in the presence of deuterium, so that its addition to the plasma signifies an increase in the total production of fusion energy. In view of the D-He$^3$ reaction, it is possible to envision that the preferred majority species mixture may contain less tritium than deuterium or even nearly pure deuterium.

The analytic calculation by Fisch (1980) reveals that the least power dissipation for a given current generated is incurred when the velocity of the heated minority species ions parallel to the toroidal magnetic field obeys the approximate equality $$v_\| \simeq v_{Te} \left( \frac{m_i}{m_e} \right)^{\frac{1}{2}} \left( \frac{1}{3} \sqrt{\frac{2}{\pi}} \frac{m_\alpha/m_i}{1 + m_\alpha/m_i} \right)^{\frac{1}{2}},$$

where $v_\|$ is the resonant (heat) minority species parallel velocity, where $v_{Te}$ is the electron thermal velocity, and where $m_\alpha$, $m_i$ and $m_e$ denote the masses of, respectively, the minority ion species, the majority ion species, and the electron species. (In the event of more than one majority ion species, this approximate equality is to be used only with consideration of the most concentrated majority species.) For use in D-T, D-D or D-He$^3$ tokamak fusion devices with the He$^3$ as the minority ion species, the preferred embodiment is to heat minority ions in the range of 3 to 6 $v_{T\alpha}$, where $v_{T\alpha}$ is the minority species thermal velocity. A minority species concentration of at most several percent appears to be sufficient for the generation of confining current.

The preferred embodiment of the invention employs fast wave heating of the minority species ions while avoiding any heating of the majority species ions. In order for this to occur, it is desirable, as discussed by Fisch (1980), to have the wave parallel phase velocity, $\omega/k_\|$, obey the approximate inequality $$\frac{\omega}{k_\|} > \frac{5v_{Ti} - 3\Omega_i v_{T\alpha}/\Omega_\alpha}{1 - \Omega_i/\Omega_\alpha},$$

where $\omega$ is the wave frequency, where $k_\|$ is the wave parallel wavenumber, where $Z_\alpha$ and $Z_i$ are, respectively, the minority and the majority ion charge states, and where $v_{Ti}$ is the majority ion thermal velocity. This inequality should hold independently for each majority species of substantial concentration in the plasma. In the preferred embodiment that is envisioned here, that is a D-T or purely D reactor with He$^3$ minority ion species, it is seen that $\omega/k_\| v_{T\alpha} \gtrsim 16$ is the preferred range of wave parallel phase velocities. The required wave frequency is such that the wave frequency $\omega$ is approximately equal to $\Omega_\alpha$ at some interior point of the plasma, so as to assure that there exist resonant minority species ions, that is, those that satisfy $v_\| = (\omega - \Omega_\alpha)/k_\|$.

The present invention, especially in its preferred embodiment, may be useful in providing sufficient current for a D-T tokamak fusion reactor. The power dissipated in the plasma, $P_d$, that is required to confine the plasma may be written approximately as $$\frac{P_d}{P_f} \simeq \frac{1}{(n_{14}T_{10}a_1R_1)^{\frac{1}{2}}(3T_{10} - 2)}$$

where $P_f$ is the fusion power output, $n_{14}$ is the electron density normalized to $10^{14}$ cm$^{-3}$, $T_{10}$ is the deuterium temperature normalized to 10 keV, and $a_1$ and $R_1$ are, respectively, the minor and major radii of the tokamak in meters. The range of applicability of this formula is approximately for $1 < T_{10} < 3$. The formula assumes a He$^3$ minority species although other minority species could, of course, also be considered. The ratio $P_d/P_f$ may be substantially less than unity, implying that the apparatus described herein represents an economically attractive means of supplying steady-state current in a fusion reactor. The formula $P_d/P_f$ is a useful aid in designing such a reactor in that the fraction of power to be recycled is directly described as a function of macroscopic plasma parameters.

It should be recognized that current generation by selective minority species heating in the manner described herein is significantly different from all previously proposed methods of generating currents. This is the only method of generating current that utilizes radiofrequency heating of an ion species. It is the only method of current generation by means of rf-waves that specifies a minimum of two ion species in the plasma. It advantageously utilizes the fast wave, or magnetosonic wave, which is in the frequency range such that it can be generated by efficient power sources. Moreover, it has been demonstrated that this wave can effectively heat the minority ion species without heating substantially either the majority ion species or the electrons. A summary and comparison of all the methods proposed for generating currents is provided by Fisch (1980b).

Further modifications of the invention herein disclosed will occur to persons skilled in the art and all such modifications are deemed to be within the spirit and scope of the invention as defined by the appended claims.

I claim:

1. A system for generating steady-state toroidal current in a toroidal plasma comprising:
    means for immersing the toroidal plasma in a steady-state toroidal magnetic field, and
    means for preparing said plasma with at least one minority ion species which has a different ion charge state than does the majority ion species and which also has a different charge to mass ratio than does the majority ion species, and
    means for injecting rf energy into said toroidal plasma such that the rf energy comprises a spectrum of waves traveling substantially in one toroidal direction,
    where said rf energy is of predetermined frequency and is phased in a predetermined manner such as to increase preferentially the cyclotron motion of minority species ions traveling in a selected toroidal direction, thereby heating the minority species ion so as to yield a velocity of the heated minority species ions parallel to the selected toroidal direction, $v_\parallel$, which is approximately equal to $v_{te}(m_i/m_e)^{\frac{1}{2}}[(\frac{1}{3})(2/\pi)^{\frac{1}{2}}((m\alpha/m_i)/(1+m\alpha/m_i))]^{\frac{1}{2}}$, where $v_{te}$ is the electron thermal velocity, and where $m\alpha, m_i, m_e$ denote the masses of, respectively, the minority ion species, the majority ion species, and the electron species.

2. System according to claim 1 where said plasma is prepared in a tokamak device wherein
    said injection of rf energy is of long duration and sufficient intensity, and
    said minority species is of sufficient concentration such that said generated toroidal current provides a poloidal magnetic field sufficient for steady-state confinement of the plasma.

3. System according to claim 2 where said rf energy is approximately of frequency $\omega = \Omega_\alpha$, where $\Omega_\alpha$ is the gyrofrequency of said minority ions in said toroidal magnetic field at some interior position of the tokamak, and where said injected rf waves are the fast waves (also known as magnetosonic waves or compressional ion cyclotron waves), and where said means for injecting such waves comprise a phased array of loop antennas.

4. System according to claim 2 where said rf energy is of frequency $\omega = \Omega_\alpha$, and where said rf waves are the fast waves, and where said means for injecting such waves comprise a phased waveguide array.

5. System according to claim 2 where said majority ion species is deuterium and said minority species is $He^3$.

6. System according to claim 2 where said prepared plasma is characterized by electron density $n_e$ in the range $10^{13}$ to $10^{15}$ cm$^{-3}$ and by absolute temperature T greater than 6 keV, wherein said plasma is immersed in a toroidal magnetic field in the range of 20 to 50 kG, and wherein said plasma is composed of a mixture of ions, such as deuterium and tritium, which are in addition to the minority species ions and which are capable of fusing under said preparation such that said tokamak is a steady-state fusion device which is a copious emitter of high-energy neutrons.

7. A method for generating steady-state toroidal current in a toroidal plasma comprising the steps of:
    immersing the toroidal plasma in a steady-state toroidal magnetic field, and
    preparing said plasma with at least one minority ion species which has a different ion charge state than does the majority ion species and which also has a different charge to mass ratio than does the majority ion species, and
    injecting rf energy into said toroidal plasma such that the rf energy comprises a spectrum of waves traveling substantially in one toroidal direction,
    where said rf energy is of predetermined frequency and is phased in a predetermined manner such as to increase preferentially the cyclotron motion of minority species ions traveling in a selected toroidal direction, thereby heating the minority species ions so as to yield a velocity of the heated minority species ions parallel to the selected toroidal direction, $v_\parallel$, which is approximately equal to $v_{te}(m_i/m_e)^{\frac{1}{2}}[(\frac{1}{3})(2/\pi)^{\frac{1}{2}}((m\alpha/m_i)/(1+m\alpha/m_i))]^{\frac{1}{2}}$, where $v_{te}$ is the electron thermal velocity, and where $m\alpha, m_i, m_e$ denote the masses of, respectively, the minority ion species, the majority ion species, and the electron species.

8. Method according to claim 7 where said plasma is prepared in a tokamak device wherein
    said injection of rf energy is of long duration and sufficient intensity, and
    said minority species is of sufficient concentration such that said generated toroidal current provides a poloidal magnetic field sufficient for steady-state confinement of the plasma.

9. Method according to claim 8 where said rf energy is approximately of frequency $\omega = \Omega_\alpha$, where $\Omega_\alpha$ is the gyrofrequency of said minority ions in said toroidal magnetic field at some interior position of the tokamak, and where said injected rf waves are the fast waves (also known as magnetosonic waves or compressional ion cyclotron waves), and where said means for injecting such waves comprise a phased array of loop antennas.

10. Method according to claim 8 where said rf energy is of frequency $\omega = \Omega_\alpha$, and where said rf waves are the fast waves, and where said means for injecting such waves comprise a phased waveguide array.

11. Method according to claim 8 where said majority ion species is deuterium and said minority species is $He^3$.

12. Method according to claim 8 where said prepared plasma is characterized by electron density $n_e$ in the range $10^{13}$ to $10^{15}$ cm$^{-3}$ and by absolute temperature T greater than 6 keV, wherein said plasma is immersed in a toroidal magnetic field in the range of 20 to 50 kG, and wherein said plasma is composed of a mixture of ions, such as deuterium and tritium, which are in addition to the minority species ions and which are capable of fusing under said preparation such that said tokamak is a steady-state fusion device which is a copious emitter of high-energy neutrons.

* * * * *